United States Patent
Thor

(10) Patent No.: US 8,086,380 B2
(45) Date of Patent: Dec. 27, 2011

(54) VARIABLE BLEED SOLENOID RECOVERY SYSTEM

(75) Inventor: Todd J. Thor, Byron, MI (US)

(73) Assignee: GM Global Technology Operations LLC

( * ) Notice: Subject to any disclaimer, the term of this patent is extended or adjusted under 35 U.S.C. 154(b) by 458 days.

(21) Appl. No.: 11/699,004

(22) Filed: Jan. 26, 2007

(65) Prior Publication Data

US 2008/0120516 A1    May 22, 2008

Related U.S. Application Data

(60) Provisional application No. 60/860,009, filed on Nov. 17, 2006.

(51) Int. Cl.
*G06F 7/00* (2006.01)
*G06F 17/00* (2006.01)

(52) U.S. Cl. ............ 701/62; 701/51; 477/166; 477/169; 477/174

(58) Field of Classification Search ............... 701/62, 701/51, 67; 477/174, 165, 169
See application file for complete search history.

(56) References Cited

U.S. PATENT DOCUMENTS

| | | | | |
|---|---|---|---|---|
| 4,642,771 A | * | 2/1987 | Asagi et al. | 701/62 |
| 4,698,764 A | * | 10/1987 | Inagaki et al. | 701/62 |
| 5,441,463 A | * | 8/1995 | Steeby | 477/79 |
| 5,445,016 A | * | 8/1995 | Neigebauer | 73/115.02 |
| 5,609,550 A | * | 3/1997 | Saxena et al. | 477/166 |
| 5,778,329 A | * | 7/1998 | Officer et al. | 701/55 |
| 5,835,876 A | * | 11/1998 | Hathaway et al. | 701/62 |
| 5,957,255 A | * | 9/1999 | Grytzelius et al. | 192/3.31 |
| 6,086,512 A | * | 7/2000 | Kondo | 477/125 |
| 6,125,316 A | * | 9/2000 | Sasaki et al. | 701/62 |
| 6,754,603 B2 | * | 6/2004 | Turbett et al. | 702/113 |
| 6,948,395 B2 | * | 9/2005 | Gierer et al. | 74/335 |
| 6,966,862 B2 | * | 11/2005 | Inuta | 475/119 |
| 7,195,098 B2 | * | 3/2007 | Hidaka et al. | 180/446 |
| 7,400,960 B2 | * | 7/2008 | Sugita | 701/62 |
| 7,421,326 B2 | * | 9/2008 | Thor et al. | 701/67 |
| 2006/0036359 A1 | * | 2/2006 | Thor et al. | 701/67 |
| 2006/0040791 A1 | * | 2/2006 | Nakajima et al. | 477/111 |

FOREIGN PATENT DOCUMENTS

| | | | |
|---|---|---|---|
| JP | 2003254429 A | * | 9/2003 |
| JP | 2003301939 A | * | 10/2003 |
| JP | 2004293706 A | * | 10/2004 |

* cited by examiner

*Primary Examiner* — Hussein Elchanti
*Assistant Examiner* — Rami Khatib

(57) ABSTRACT

A recovery control system and method for automatic transmissions includes a diagnostic module that determines a fault condition of a variable bleed solenoid (VBS) when the automatic transmission fails to establish a desired drive ratio. A recovery module initiates a recovery cycle of the VBS based on the fault condition. The fault condition includes one of a clutch stuck-on condition and a clutch stuck-off condition. A clutch controlled by the VBS fails to disengage during the clutch stuck-on condition, and the clutch fails to engage during the clutch stuck-on condition.

22 Claims, 4 Drawing Sheets

| Range | Clutches Engaged | | | | |
|---|---|---|---|---|---|
| | C1 | C2 | C3 | C4 | C5 |
| 1 | X | | | | X |
| 2 | X | | | X | |
| 3 | X | | X | | |
| 4 | X | X | | | |
| 5 | | X | X | | |
| 6 | | X | | X | |
| R | | | X | | X |
| N | | | | | X |

FIG. 2

VARIABLE BLEED SOLENOID RECOVERY SYSTEM

CROSS-REFERENCE TO RELATED APPLICATIONS

This application claims the benefit of U.S. Provisional Application No. 60/860,009, filed on Nov. 17, 2006. The disclosure of the above application is incorporated herein by reference.

FIELD

The present disclosure relates to methods and systems for controlling shifts of a clutch to clutch transmission.

BACKGROUND

The statements in this section merely provide background information related to the present disclosure and may not constitute prior art.

Automatic transmissions typically include several fluid operated torque transmitting devices such as clutches. The clutches automatically engage and disengage according to a predefined pattern to establish different speed ratios between input and output shafts of the transmission.

The various speed ratios of the transmission are typically defined in terms of the ratio Ni/No, where Ni is the input shaft speed and No is the output shaft speed. Shifting between various speed ratios generally involves disengaging a clutch associated with the current or actual speed ratio, and engaging a clutch associated with the desired speed ratio. The clutch to be released is referred to as the off-going clutch, while the clutch to be engaged is referred to as the on-coming clutch. Shifts of this type are referred to as clutch-to-clutch because no speed responsive or freewheeling elements are used.

The engaging and releasing of the clutches is controlled by solenoid operated valves that supply hydraulic fluid to the clutches. For example, a variable bleed solenoid (VBS) valve is a current-controlled, electro-hydraulic actuator that provides an outlet pressure that is a precise function of the current applied to the valve. A constant pressure is supplied to the valve through a fixed control orifice to a control chamber formed by the valve. The control chamber pressure can be controlled by allowing the control chamber to bleed to a reservoir through the variable orifice formed by the VBS valve. With this structure, a VBS valve can regulate fluid pressure from a maximum value to a minimum value.

SUMMARY

A recovery control system and method for automatic transmissions includes a diagnostic module that determines a fault condition of a variable bleed solenoid (VBS) when the automatic transmission fails to establish a desired drive ratio. A recovery module initiates a recovery cycle of the VBS based on the fault condition. The fault condition includes one of a clutch stuck-on condition and a clutch stuck-off condition. A clutch controlled by the VBS fails to disengage during the clutch stuck-on condition, and the clutch fails to engage during the clutch stuck-on condition.

In other features, the diagnostic module increments one of a first count value and a second count value associated with the VBS when the diagnostic module detects one of the stuck-on condition and the stuck-off condition, respectively. The recovery module initiates the recovery cycle when the diagnostic module increments one of the first count value and the second count value.

In other features, the diagnostic module stores a first threshold and a second threshold associated with the stuck-on condition and the stuck-off condition, respectively, and the diagnostic module activates a fault indicator when one of the first count value and the second count value exceeds one of the first threshold or the second threshold, respectively. The recovery module continues to execute the recovery cycle when the diagnostic module activates the fault indicator.

A recovery control system for a variable bleed solenoid (VBS) for an automatic transmission includes a recovery module that initiates a recovery cycle of the VBS when one of a first value and a second value that correspond to a clutch stuck-on condition or a clutch stuck-off condition, respectively, is detected. A diagnostic module activates a fault indicator when one of the first value and the second value exceeds one of a first threshold and a second threshold, respectively. A clutch controlled by the VBS fails to disengage during the clutch stuck-on condition and the clutch fails to engage during the clutch stuck-on condition.

In other features, the diagnostic module increments one of the first value and the second value associated with the VBS when the diagnostic module detects one of the stuck-on condition and the stuck-off condition, respectively. The recovery module initiates the recovery cycle when the diagnostic module increments one of the first value and the second value. The recovery module continues to execute the recovery cycle when the diagnostic module activates the fault indicator.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 2 is a chart illustrating the required clutches to be engaged in order to achieve a desired gear for an exemplary six-speed clutch to clutch transmission according to the present disclosure;

DETAILED DESCRIPTION

Figure 1:
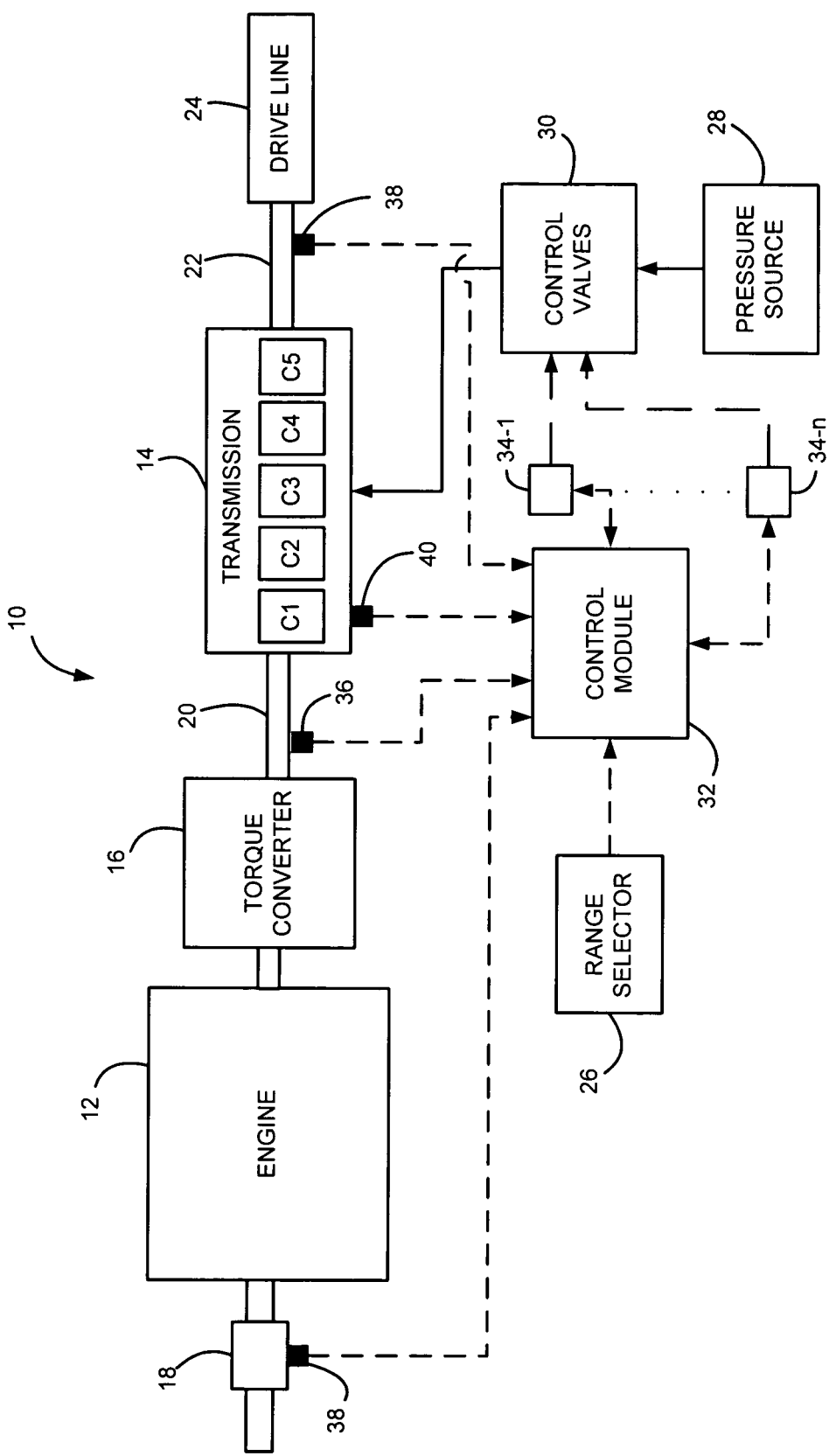
FIG. 1 is a functional block diagram of a vehicle including a clutch to clutch transmission according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle is shown generally at 10. The vehicle includes an engine 12 that drives a transmission 14 through a torque converter 16. Air is drawn into the engine 12 through a throttle 18. The air is mixed with fuel and combusted within cylinders (not shown) of the engine 12 to produce drive torque. The torque converter 16 supplies the engine torque to the transmission via an input shaft 20. The transmission 14 is a multi-speed automatic clutch-to-clutch transmission that drives an output shaft 22 based on engine torque. As can be appreciated, the transmission can also be any type of automatic transmission. For exemplary purposes, the present disclosure will be discussed in the context of the clutch-to-clutch transmission.

The output shaft 22 drives a driveline 24 of the vehicle 10. A range selector 26 enables an operator to set the transmission at a desired operating range including, but not limited to, park, reverse, neutral, and one or more forward drive positions. Speed and torque relationships between the engine 12 and the driveline 24 are controlled by hydraulically operated clutches C1, C2, C3, C4, and C5 of the transmission 14 that enable, for example, six speed ranges. Pressurized fluid is provided to the clutches from a regulated hydraulic pressure source 28. The clutches are coupled to the hydraulic pressure source 28 via control valves 30, which regulate clutch pressure by supplying or discharging fluid to/from the clutches C1, C2, C3, C4, and C5. A control module 32 controls variable bleed solenoids (VBSs) 34-1, ..., and 34-$n$, referred to collectively as VBSs 34, to operate the control valves 30. Variable bleed solenoids are electronically controlled valve mechanisms which generate output signals based on control signals transmitted from the control module 32. In the present implementation, the control module 32 selectively controls various combinations of the VBSs 34 to achieve various drive ratios. Each of the VBSs 34 may control one or more clutches.

Referring now to FIG. 2, in the exemplary transmission, the clutches C1, C2, C3, C4 and C5, referred to collectively as the clutches, are selectively engaged to provide neutral, six forward drive ratios, and one reverse drive ratio. Although the exemplary automatic transmission 14 includes six forward drive ratios and one reverse drive ratio, it is appreciated that the recovery control system according to the present disclosure can be implemented in automatic transmissions having more or fewer drive ratios. In the present implementation each forward drive ratios. The table of FIG. 2 illustrates an exemplary combination of engaged clutches to establish the various drive ratios.

The first forward drive ratio is established by engaging the first clutch C1 and the fifth clutch C5. The second forward drive ratio is established by disengaging the fifth clutch C5 and substantially simultaneously engaging the fourth clutch C4. To establish the third forward drive ratio, the fourth clutch C4 is disengaged as the third clutch C3 is engaged. The fourth forward drive ratio is established by disengaging the third clutch C3 while engaging the second clutch C2. To establish the fifth forward drive ratio, the first clutch C1 is disengaged as the third clutch C3 is substantially simultaneously engaged. The sixth forward drive ratio is established by disengaging the third clutch C3 and simultaneously engaging the fourth clutch C4. The reverse drive ratio is established by engaging the third clutch C3 and the fifth clutch C5. The transmission 14 is in neutral when only the fifth clutch C5 is engaged.

Each drive ratio requires the engagement of different combinations of the clutches. Further, shifting between successive forward ratios (shift pattern) is accomplished by disengaging one of the clutches, deemed the off-going clutch, and substantially simultaneously engaging the next clutch, deemed the on-coming clutch, while another clutch is engaged during the transition. For example, given the exemplary transmission described above, shifting from the first drive ratio to the second drive ratio is achieved by keeping clutch C1 engaged, disengaging clutch C5 and engaging clutch C4.

Referring back to FIG. 1, a first speed sensor 36 is responsive to a rotational speed of the input shaft 20 and generates an input shaft speed signal. A second speed sensor 38 is responsive to a rotational speed of the output shaft 22 and generates an output shaft speed signal. A temperature sensor 40 is responsive to a temperature of a transmission fluid and generates a transmission fluid temperature signal.

Operation of the pressure source 28 and the control valves 30 is controlled by the control module 32 via the VBSs 34 in response to various input signals. The input signals include, but are not limited to, the input shaft speed signal ($N_T$), the output shaft speed signal ($N_O$), the transmission fluid temperature signal ($F_t$) and a range selector position signal that is generated by the range selector 26. The control module 32 generates control signals based on the input signals to energize select VBSs 34 to achieve a desired drive ratio. The VBSs 34 regulate the hydraulic pressure supplied by the control valves 30. Clutch pressure effects shifting between speed ratios by controllably releasing the pressure in an off-going clutch and controllably applying pressure to an on-coming clutch.

The recovery control system of the present disclosure delays reporting a fault code that indicates performance degradation of the vehicle 10 until the recovery control system attempts to reestablish proper operation of the vehicle 10.

Figure 3:
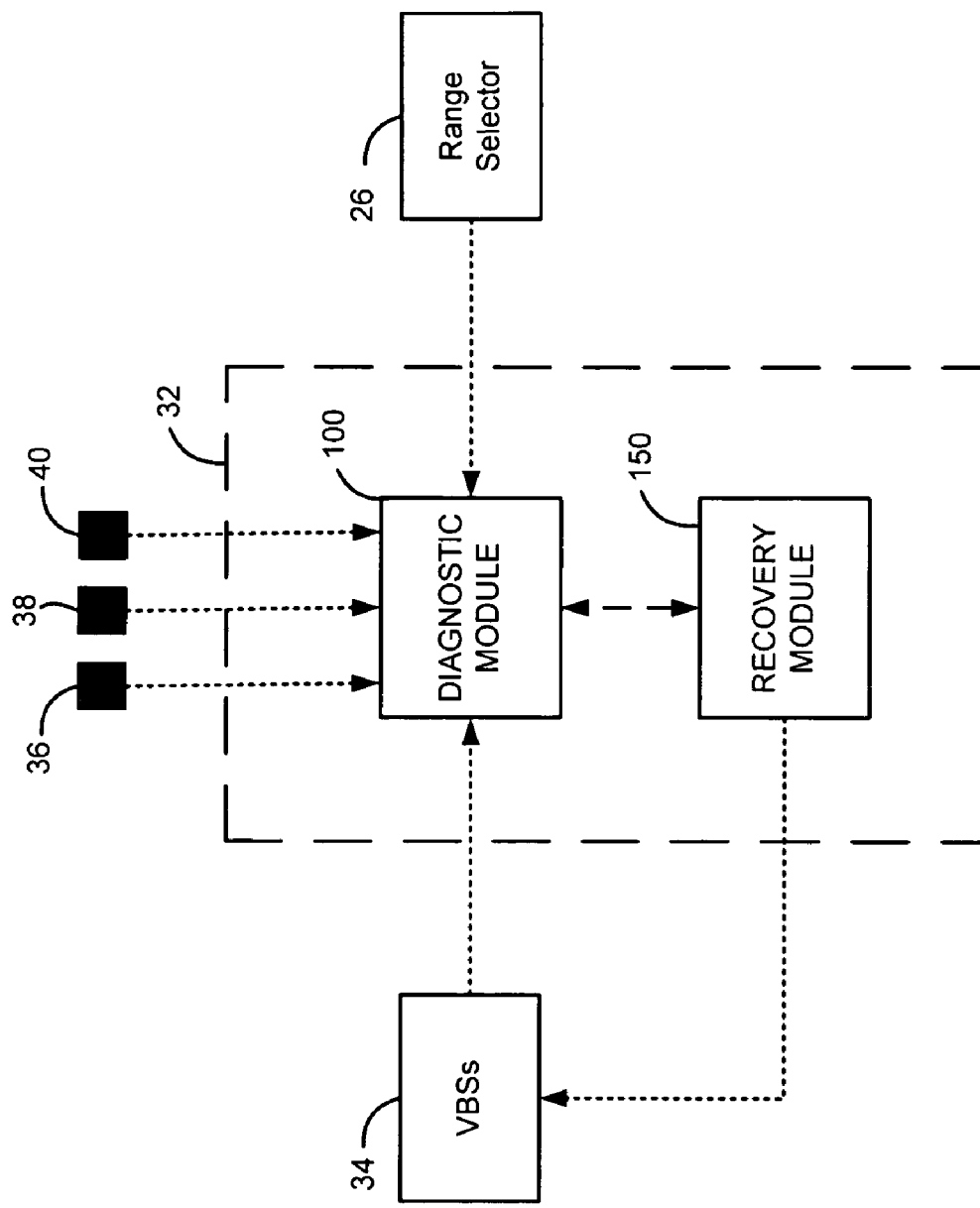
FIG. 3 is a block diagram depicting a control module according to the present disclosure.

Referring now to FIG. 3, the control module 32 includes a diagnostic module 100 and a recovery module 150. The diagnostic module 100 communicates with the VBSs 34, the first speed sensor 36, the second speed sensor 36, the temperature sensor 40, and the range selector 26. The diagnostic module 100 determines that one of the VBSs 34 is experiencing a fault condition (i.e. a failed VBS) when the transmission 14 fails to establish a desired drive ratio required by the shift pattern. The diagnostic module 100 identifies the failed VBS based in part on the on the range selector position signal, the input shaft speed signal, and the output shaft speed signal.

Several problems can cause the fault including, but not limited to, debris within the failed VBS, debris within a control valve 30, and/or a malfunction of one of the clutches. As discussed above with respect to FIG. 1, each of the VBSs 34 control one or more clutches by regulating the hydraulic pressure supplied to the clutches by the control valves 30. A failed VBS can result in a clutch fault condition (e.g., clutch "stuck-on" or clutch "stuck-off"). During a clutch stuck-on condition, the transmission 14 cannot disengage a clutch being used during the current or actual speed ratio. During a clutch stuck-off condition, the transmission 14 cannot select or engage a clutch needed to achieve a desired speed ratio. The diagnostic module 100 increments a stuck-on value or a stuck-off value associated with the failed VBS based on detecting a stuck-on condition or a stuck-off condition, respectively. The diagnostic module 100 stores a distinct stuck-on threshold and stuck-off threshold for each of the VBSs 34 in a memory (not shown).

The recovery module 150 communicates with diagnostic module 100 and initiates a recovery cycle of the failed VBS 34 based on detecting a respective stuck-on value or stuck-off value associated with the failed VBS 34. The recovery module 150 commands the failed VBS to periodically cycle between an active mode (ON) and an inactive mode (OFF) to regain operation of the failed VBS. In various embodiments, the recovery module 150 varies a hydraulic fluid pressure provided to the failed VBS. Additionally, the recovery module 150 can vary a frequency of the hydraulic fluid pressure to attempt to regain operation of the failed VBS.

The recovery module 150 continues to periodically cycle the failed VBS until the vehicle 10 again requires the use of the failed VBS to establish a desired speed ratio. The diagnostic module 100 then determines whether the failed VBS is functioning properly based on the range selector position signal, the input shaft speed signal, and the output shaft speed signal. If the failed VBS continues to experience the fault condition, the diagnostic module increments the stuck-on value or the stuck-off value associated with the failed VBS.

The diagnostic module 100 delays reporting a fault associated with the failed VBS until the stuck-on value or stuck-off value exceeds the respective stuck-on threshold or stuck-off threshold associated with the failed VBS. Each of the VBSs 34 possesses calibrated stuck-on and stuck-off thresholds due to a varying degree of use of various clutches by a driver or operator (not shown) of the vehicle 10 during a drive cycle. For example, a drive cycle of the vehicle 10 may execute a shift pattern requiring forward drive ratios 1-6. As depicted in FIG. 2, the C1 corresponds to forward drive ratios 1-4 and the C2 corresponds to forward drive ratios 2 and 6. A failed VBS that controls the operation of C1 would result in the transmission 14 having to establish the fifth forward drive cycle upon initiating the drive cycle during a stuck-off condition. However, a failed VBS that controls the operation of the C4 would require the shift pattern to transition from the first forward drive ratio to the third forward drive ratio during a stuck-on condition. Furthermore, the failed VBS corresponding to the C4 would force the transmission 14 to remain in the fifth forward drive ratio when the transmission 14 commanded a shift to the sixth forward drive ratio.

Typically, a failed VBS corresponding to the C1 should impact the performance of the vehicle 10 to a greater extent relative to a failed VBS corresponding to the C4. Therefore, the stuck-off threshold for a VBS 34 associated with the C1 may exceed the stuck-off threshold a VBS 34 associated with the C4. In other words, a failure of the C4 to engage is typically more tolerable to a driver of the vehicle 10 relative to a failure of the C1 in the present implementation. Those skilled in the art will appreciate that various stuck-on and stuck-off thresholds are contemplated. In the present implementation, the control module 32 activates a fault indicator (e.g., a light) informing the driver of the vehicle 10 of a fault condition when the stuck-on or stuck-off value exceeds the stuck-on or stuck-off threshold for one of the VBSs 34.

Figure 4:
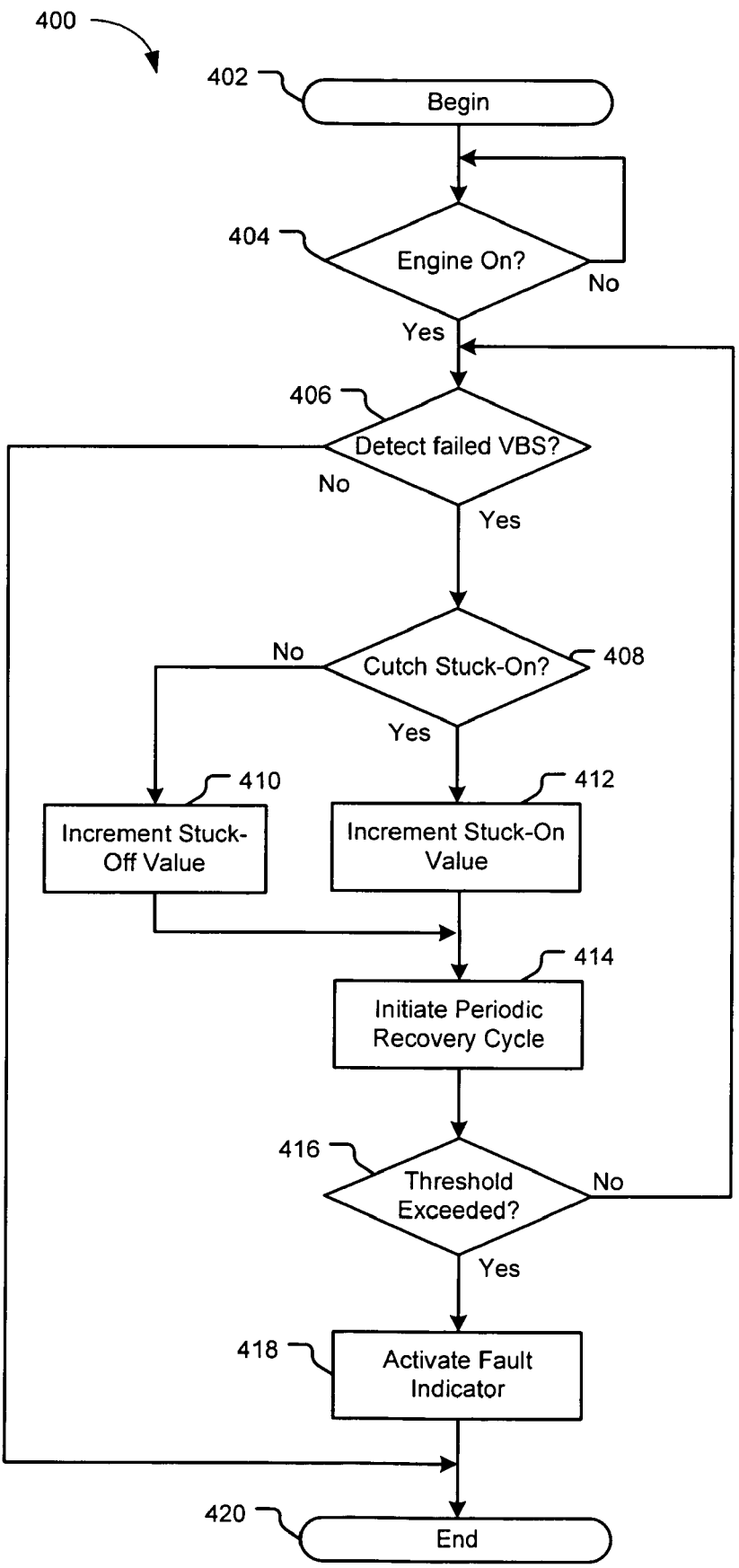
FIG. 4 is a flowchart illustrating exemplary steps executed by a recovery control system according to the present disclosure.

Referring now to FIG. 4, a method 400 of operating the recovery control system will be discussed in more detail. Control begins the method in step 402. In step 404, the control determines whether the engine 12 is turned on. If the engine 12 is turned off, the method 400 returns to step 404. If the engine 12 is turned on, control proceeds to step 406. In step 406, control determines whether a failed VBS of the VBSs 34 has been detected. If a failed VBS has not been detected, control proceeds to step 420. If a failed VBS has been detected, control proceeds to step 408.

In step 408, control determines whether the clutch fault condition is a clutch stuck-on condition. If the clutch fault condition is not a clutch stuck-on condition, control proceeds to step 410. In step 410, control increments the clutch stuck-off value associated with the failed VBS. If the clutch fault condition is a clutch stuck-on condition in step 408, control increments the clutch stuck-on value associated with the failed VBS in step 412. In step 414, control initiates a periodic recovery cycle of the failed VBS.

In step 416, control determines whether the clutch stuck-on value or the clutch stuck-off value has exceeded the stuck-on threshold or the stuck-off threshold associated with the failed VBS. If the stuck-on threshold or the stuck-off threshold has not been exceeded, control returns to step 406. If the stuck-on threshold or the stuck-off threshold has been exceeded, control proceeds to step 418. In step 418, control activates a fault indicator. In step 420, the method 400 ends.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A recovery control system for automatic transmissions, comprising:
a diagnostic module that determines a fault condition of a variable bleed solenoid (VBS) when an automatic transmission fails to establish a desired ratio of transmission input shaft speed to transmission output shaft speed and that identifies one of N VBSs of the automatic transmission with said fault condition, said identification being based on a range selector position, said transmission input shaft speed, and said transmission output shaft speed,
wherein N is an integer greater than one; and
a recovery module that initiates a recovery cycle of said one of said N VBSs with said fault condition.

2. The system of claim 1 wherein said fault condition includes one of a clutch stuck-on condition and a clutch stuck-off condition, a clutch controlled by said one of said N VBSs fails to disengage during said clutch stuck-on condition, and said clutch fails to engage during said clutch stuck-off condition.

3. The system of claim 2 wherein said diagnostic module increments one of a first count value and a second count value associated with said one of said N VBSs when said diagnostic module detects one of said stuck-on condition and said stuck-off condition, respectively.

4. The system of claim 3 wherein said recovery module initiates said recovery cycle when said diagnostic module increments one of said first count value and said second count value.

5. The system of claim 3 wherein said diagnostic module stores a first threshold and a second threshold associated with said stuck-on condition and said stuck-off condition, respectively, and said diagnostic module activates a fault indicator when one of said first count value and said second count value exceeds one of said first threshold or said second threshold, respectively.

6. The system of claim 5 wherein said recovery module continues to execute said recovery cycle when said diagnostic module activates said fault indicator.

7. The system of claim 1 wherein the recovery module commands said one of said N VBSs to periodically cycle between an active mode and an inactive mode during the recovery cycle.

8. The system of claim 1 wherein the recovery module varies a hydraulic fluid pressure provided to said one of said N VBSs during the recovery cycle.

9. The system of claim 8 wherein the recovery module varies a frequency of the hydraulic fluid pressure provided to said one of said N VBSs during the recovery cycle.

10. The system of claim 1 wherein said recovery module performs said recovery cycle until a next time that said one of said N VBSs is used to establish said desired ratio.

11. The system of claim 10 wherein, after said next time, said diagnostic module determines whether said one of said N VBSs has said fault condition based on said range selector position, said transmission input shaft speed, and said transmission output shaft speed.

12. A recovery control method for automatic transmissions, comprising:
   determining a fault condition of a variable bleed solenoid (VBS) when an automatic transmission fails to establish a desired ratio of transmission input shaft speed to transmission output shaft speed;
   identifying one of N VBSs of the automatic transmission with said fault condition based on a range selector position, said transmission input shaft speed, and said transmission output shaft speed; and
   initiating a recovery cycle of said one of said N VBSs with said fault condition.

13. The method of claim 12 wherein said fault condition includes one of a clutch stuck-on condition and a clutch stuck-off condition, a clutch controlled by said one of said N VBSs fails to disengage during said clutch stuck-on condition, and said clutch fails to engage during said clutch stuck-off condition.

14. The method of claim 13 further comprising incrementing one of a first count value and a second count value associated with said one of said N VBSs based on detecting one of said stuck-on condition and said stuck-off condition, respectively.

15. The method of claim 14 further comprising initiating said recovery cycle based on incrementing one of said first count value and said second count value.

16. The method of claim 14 further comprising storing a first threshold and a second threshold associated with said one of said N VBSs and activating a fault indicator when one of said first count value and said second count value exceeds one of said first threshold and said second threshold, respectively.

17. The method of claim 16 further comprising continuing to execute said recovery cycle when said fault indicator is activated.

18. The method of claim 12 further comprising commanding said one of said N VBSs to periodically cycle between an active mode and an inactive mode during the recovery cycle.

19. The method of claim 12 further comprising varying a hydraulic fluid pressure provided to said one of said N VBSs during the recovery cycle.

20. The method of claim 19 further comprising varying a frequency of the hydraulic fluid pressure provided to said one of said N VBSs during the recovery cycle.

21. The method of claim 12 further comprising performing said recovery cycle until a next time that said one of said N VBSs is used to establish said desired ratio.

22. The method of claim 21 further comprising, after said next time, determining whether said one of said N VBSs has said fault condition based on said range selector position, said transmission input shaft speed, and said transmission output shaft speed.

* * * * *